Dec. 24, 1963     S. J. SPOWART ETAL     3,115,250
DOUBLES ELIMINATOR FOR DOUGH ROUNDING MACHINE
Filed April 24, 1961     3 Sheets-Sheet 1

INVENTORS
Samuel J Spowart
DeWitt Goodman and
Dan Sutherland.
BY
ATTORNEY

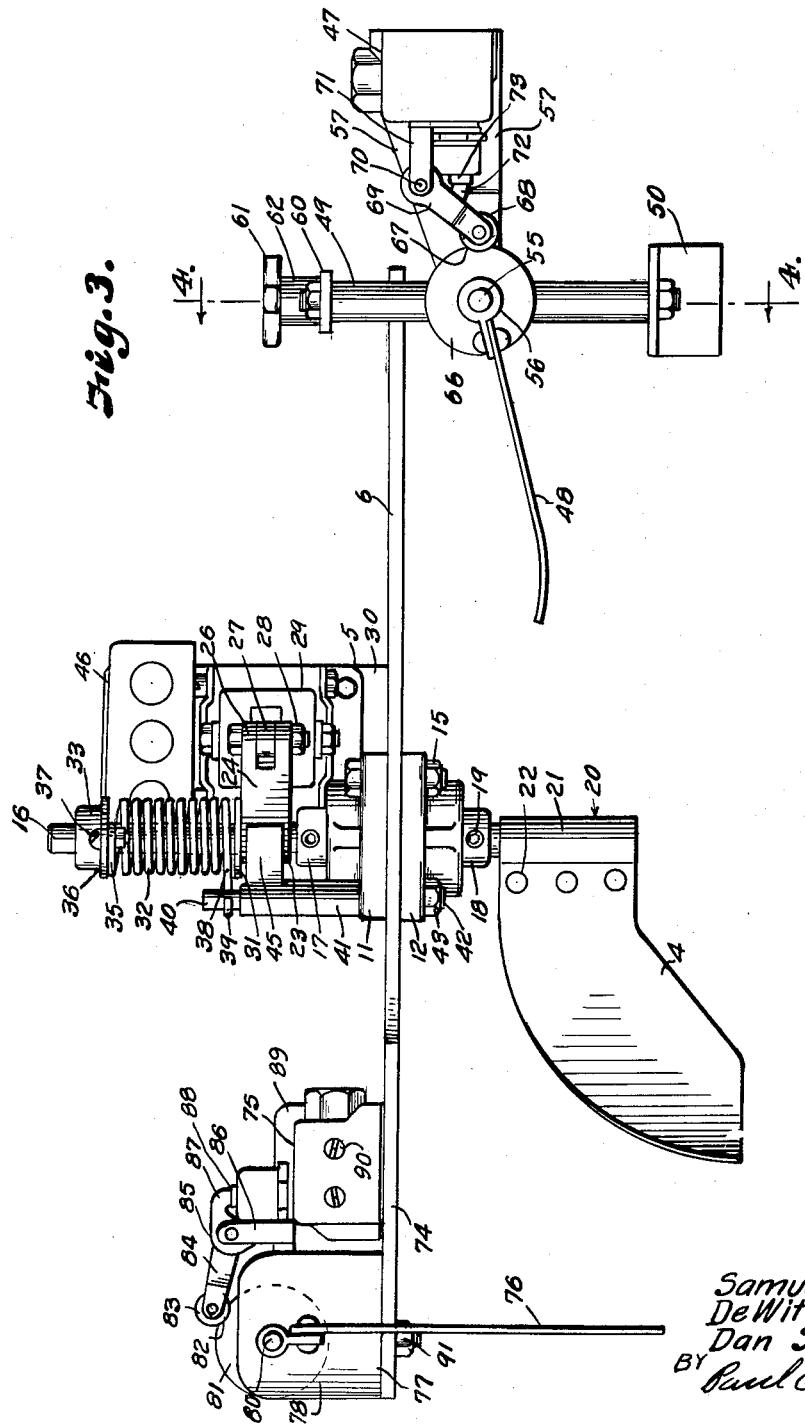

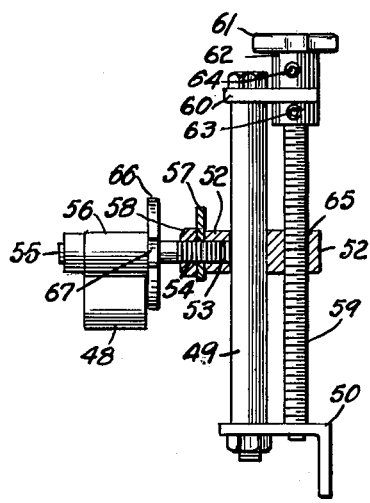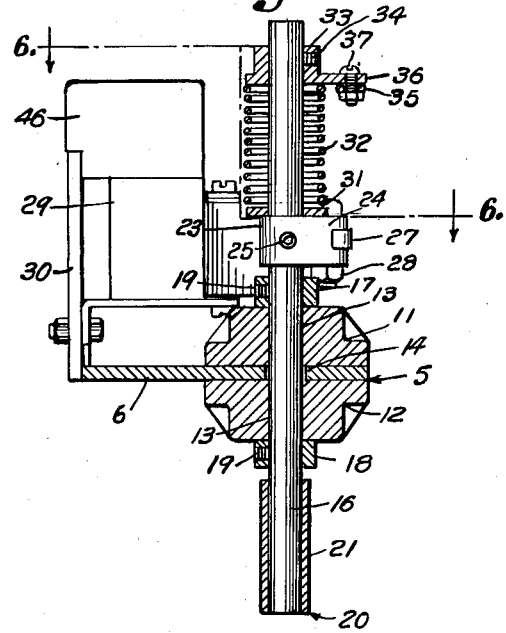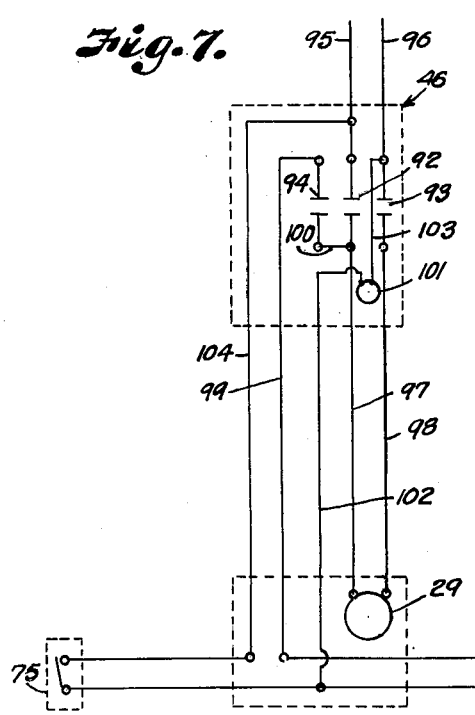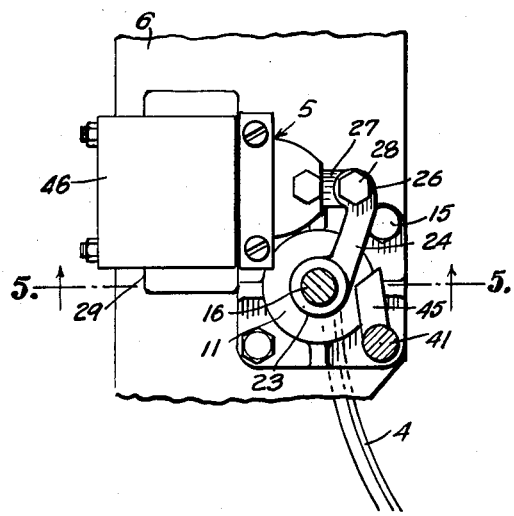
INVENTORS
Samuel J. Spowart
DeWitt Goodman and
BY Dan Sutherland
Paul E. Mullendore
ATTORNEY

United States Patent Office 3,115,250
Patented Dec. 24, 1963

3,115,250
DOUBLES ELIMINATOR FOR DOUGH ROUNDING MACHINE
Samuel J. Spowart, Des Moines, Iowa, and De Witt Goodman, Dallas, and Dan Sutherland, Red Oak, Tex., assignors to Campbell Taggart Associated Bakeries, Inc., Dallas, Tex., a corporation of Delaware
Filed Apr. 24, 1961, Ser. No. 105,014
2 Claims. (Cl. 209—90)

This invention relates to an apparatus for eliminating double pieces of dough before they reach the overhead proofer.

For example, in the course of making bread in a commercial bakery, dough is cut into pieces of given weight, rounded into balls, and the balls conveyed to an overhead proofer, all of which is automatic and carried on mechanically. It often happens that two pieces of dough become stuck together, so that when they come out of the rounder they are united into a single ball of dough of substantially larger diameter than the others. These balls of dough are called "doubles" and they are too large for the baking pans. If these doubles are allowed to proceed further than the rounder, they seriously interfere with orderly procedure and it is desirable to eliminate any doubles that may be formed, on discharge from the rounder.

It is, therefore, the principal object of the present invention to provide a simple apparatus that is readily attached to the conventional dough rounding machine and which automatically passes the single pieces of dough to the proofer, but which bypasses the doubles into a suitable receptacle waiting to receive them. In this way, the doubles may be discarded and collected for remix with the dough supplied to the cutter, and the singles proceed in the usual manner to the proofer without interference.

In carrying out the invention, we provide a flipper gate that is held in position by an electromagnet, to deflect single dough pieces from the rounder to the proofer, but which automatically opens under spring action whenever a double dough piece comes under a size sensing flap to open a switch for breaking a holding circuit to the electromagnet. When the holding circuit is broken, the flipper gate swings open under spring action to allow the double piece of dough to pass into the collecting receptacle. On passing the gate, the double piece of dough makes contact with a second flap operated switch for closing the holding circuit to the electromagnet. Immediately upon reenergization of the electromagnet, the electromagnet swings the gate to closed position against action of its spring to hold the gate closed, thereby deflecting the single dough pieces to the proofer.

Other objects of the invention are, therefore, to provide an adjustable support for the sensing flap mechanism whereby the sensing flap is readily positioned to be contacted by the double pieces of dough that are to be passed through the gate into the collecting receptacle; and to provide a gate and a simple control mechanism therefor so that the gate remains open under action of its spring a sufficient time for a double piece of dough to pass, and which immediately snaps closed for deflecting the following single pieces of dough to the proofer.

In accomplishing these and other objects of the invention, we have provided improved structure, the preferred form of which is illustrated in the accompanying drawings, wherein:

FIG. 3 is an enlarged detailed view of the doubles eliminating apparatus as viewed from the direction of the arrow of FIG. 1.

FIG. 4 is a vertical section through the sensing flap mechanism, the section being taken on the line 4—4 of FIG. 3.

FIG. 5 is a section through the operating mechanism of the gate on the line 5—5 of FIG. 6.

FIG. 6 is an enlarged plan view of the operating mechanism for the gate.

FIG. 7 is a wiring diagram of the electrical circuits.

Referring more in detail to the drawings:

1 designates a dough rounding machine known to the bakery industry as a "union rounder" and in which pieces of dough A are rounded into ball shape and discharged from the rim 2 thereof into a conveyor 3 for elevating the rounded balls of dough to an overhead proofer, not shown. As above stated, it often happens that two pieces of dough become stuck together, so that when they are discharged over the rim 2 to the conveyor 3, they interfere with orderly procedure unless an operator notices the overly large or double piece of dough and removes it as it passes from the rounder into the conveyor 3. The usual rounding machine, therefore, requires substantially constant attention in order to reduce as much as possible the passage of doubles B to the overhead proofer.

Figure 1:
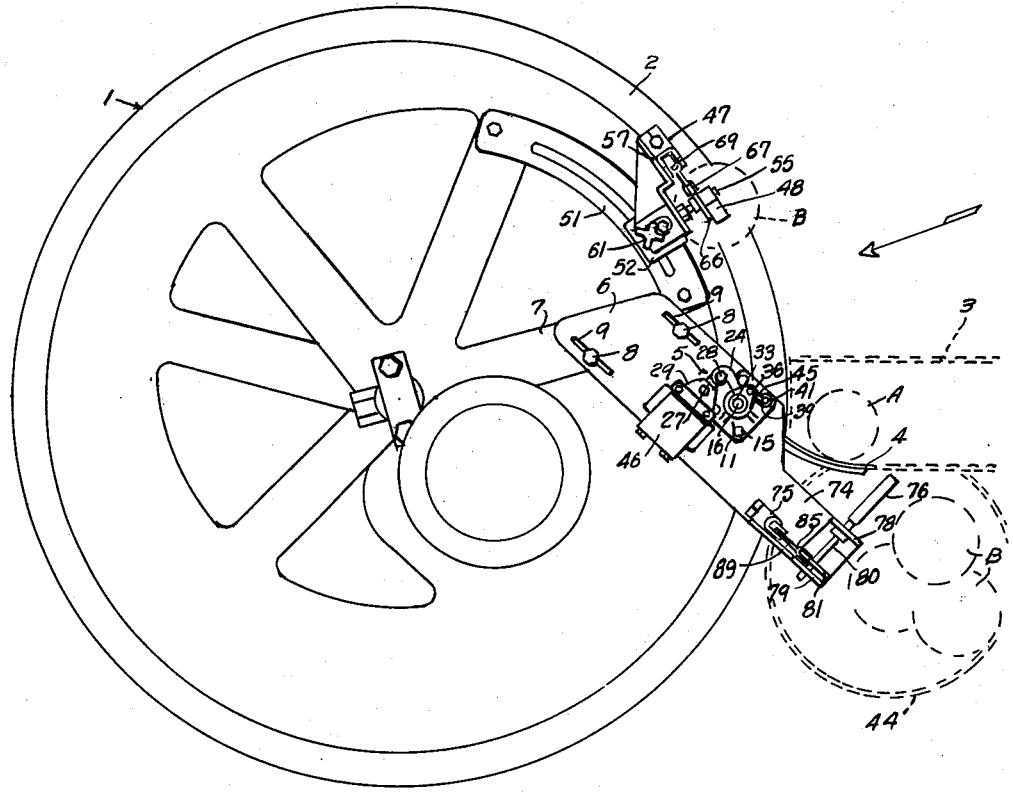
FIG. 1 is a plan view of a dough rounding machine equipped with a doubles eliminating apparatus constructed in accordance with the present invention.

To avoid this difficulty and to make elimination of double pieces of dough automatic, we provide a gate 4 that is supported in the path of the dough pieces to divert single pieces of dough A onto the conveyor 3 (see FIG. 1). The gate 4 is held in deflecting position as shown in FIG. 1 by a mechanism 5 and which includes a supporting plate or base 6 that is attached at a proper angle to a fixed part 7 of the rounder by bolts 8. The shanks of the bolts 8 extend through adjusting slots 9 in the supporting plate 6 and through spacers 10 (FIG. 2) that support the plate in desired elevation relatively to the rim 2 of the dough rounder.

Fixed to the upper and lower sides of the plate 6 are bearing brackets 11 and 12 having vertical bores 13 (FIG. 5) registering with an opening 14 in the plate 6. The bearing brackets 11 and 12 are secured to the plate 6 by fastening devices such as bolts 15. Rotatably mounted in the bores 13 of the bearing brackets 11 and 12 and extending through the opening 14 of the plate 6 is a vertical shaft 16 that is oscillatably supported in the bearing brackets 11 and 12 by means of collars 17 and 18 engaging the upper and lower bearing brackets 11 and 12 and secured to the shaft 16 by set screws 19 (FIGS. 3 and 5).

The gate 4 is fixed to an arm 20 having a sleeve 21 that is fixed rigidly on the shaft 16. The gate 4 is fixed to the arm 20 by fastening devices 22 (FIG. 3). The shaft 16 protrudes upwardly from the upper collar 17 and carries the hub 23 of an actuating arm 24, the hub 23 of the arm 24 being secured to the shaft 16 by a set screw 25. The outer end of the actuating arm has a yoke 26 that is pivotally connected with a link 27 by a bolt 28 (FIGS. 3 and 5). The link 27 is connected with the armature of a standard electromagnet 29 that is carried on an extension 30 of the supporting plate 6, as best shown in FIGS. 3 and 5.

Sleeved over the upper end of the shaft 16 and bearing on the hub 23 of the actuating arm 24 is a washer 31 seating the lower end of a coil spring 32 that is also sleeved over the projecting end of the shaft 16, and which has its opposite end seated against a collar 33 that is secured to the shaft by a set screw 34 (FIG. 5).

The coil spring 32 has an upper terminal 35 fixed to an arm 36 of the collar 33 by a fastening device such as a bolt 37. The lower end of the spring 32 has an arm 38 terminating in a hook 39 (FIG. 3) which engages over a pin portion 40 on a fixed post 41 that is supported in fixed position by a reduced shank 42 thereof extending through the bearing brackets and which is clamped thereto by a jam nut 43. The coil spring 32 is tensioned by turning thereof in an anticlockwise direction (FIG. 6) to exert an unwinding force in a clockwise direction on the shaft 16, so that the gate 4 is normally in open position to pass doubles B into a receptacle 44 (FIG. 1). The post 41 carries a stop arm 45 that projects in the path of the actuating arm (see FIGS. 3 and 6), to hold the gate 4 from swinging too far out of position under action of the coil spring 32 when the electromagnet 29 is de-energized, as later to be described.

The electromagnet 29, however, is normally energized by a holding circuit of a relay 46 and connected into the holding circuit is a normally closed switch 47 adapted to be actuated by a sensing flap 48. The sensing flap 48 is best illustrated in FIGS. 3 and 4, and is adjustably supported over the path of the dough pieces on a vertical guide post 49 that has the lower end thereof fixed to a bracket 50 that is attached to a fixed part 51 (FIG. 1) of the rounder 1, so that it is adjustable along the rim 2 to and from the conveyor 3. Slidable on the post 49 is a block 52 having a threaded socket 53 in the end thereof for mounting the shank 54 of a laterally extending arm 55, for providing a pivotal mounting for the hub 56 of the sensing flap 48. Also fixed to the block 52 and mounted on the threaded shank 54 of the arm 55 is a laterally extending bracket 57 carrying the switch 47 (FIG. 3).

The bracket 57 is retained in rigid position on the shank 54 by a jam nut 58 (FIG. 4). The block 52 and the parts carried thereby are vertically adjustable on the post 49 by means of a threaded screw shaft 59, having its lower end journaled in the bracket 50 that carries the post 49 and its upper end in a laterally extending arm 60 carried by the upper end of the post 49. The screw shaft 59 projects through the arm 60 and carries an adjusting knob 61 having a hub 62 bearing on the upper side of the arm 60, as shown in FIG. 4. The screw 59 also carries a collar 63 engaging the under side of the arm 60. The collar 63 and hub 62 of the knob 61 are secured to the screw shaft 59 by set screws 64. The screw 59 extends through a threaded opening 65 in the block 52 (FIG. 4), so that when the adjusting knob 61 is rotated in one or the other direction, the screw feeds the block 52 up or down on the post 49, to raise and lower the sensing flap 48 to bring it into position for engaging a double dough piece B and to pass the single dough pieces A thereunder without actuation thereof.

When a large dough piece B passes under the flap 48, the flap 48 is raised thereby to actuate a linkage between the sensing flap 48 and the switch 47 and which comprises a disk 66 oscillatable with the sensing flap 48. The disk 66 has a notch 67 in the periphery thereof for engaging a roller 68 on an arm 69 that is pivotally supported on a pin 70 carried by an arm 71 projecting from the switch housing, as shown in FIG. 3. The arm 69 has a protrusion 72 on the underside thereof for contacting an actuator 73 of the switch 47. The sensing flap 48 is supported in its normal position by the roller 68 engaging in the notch 67, but when the flap 48 is raised, as by a large piece of dough B, the disk 66 swings in a clockwise direction (FIG. 3) to pivot the roller arm 69 and press the protrusion 72 thereof against the switch actuator 73, for opening the switch 47, thereby breaking the holding circuit to the electromagnet 29, as later described, and releasing the gate 4 to swing under the stored up action of the spring 32.

Figure 2:
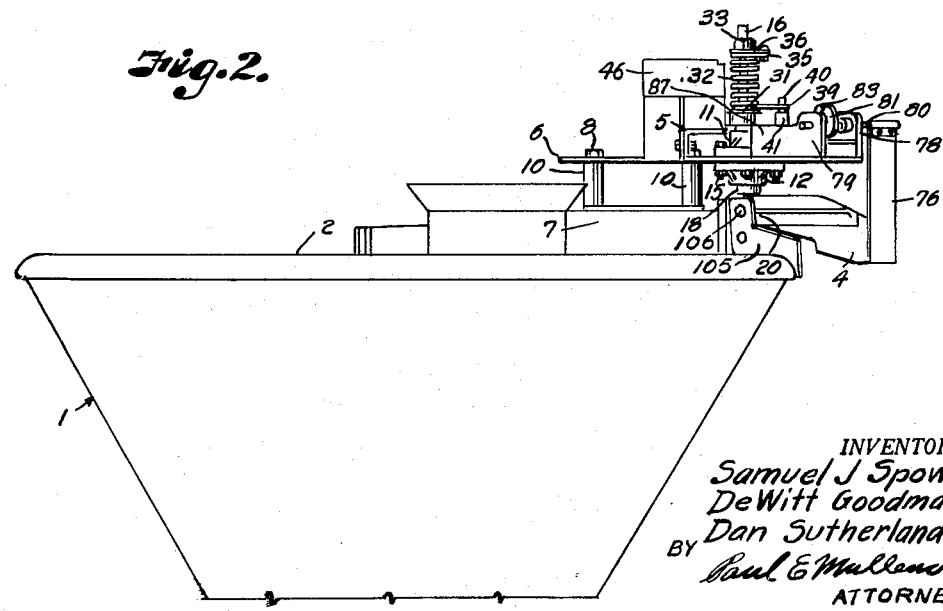
FIG. 2 is a side elevational view of the upper portion of the machine and showing the doubles eliminating apparatus in elevation.

The supporting plate 6 has an extension 74 for supporting a switch 75 and a feeler flap 76 therefor, with the flap 76 in the path of the double piece of dough B after it has passed the gate 4 to reestablish the holding circuit and again energize the electromagnet 29 to close the gate against action of the coil spring 32. The switch 75 and flap 76 are best illustrated in FIGS. 1, 2 and 3, and are supported on the extension 74. The extension 74 carries a bracket 77 of generally channel shape to provide spaced apart ears 78 and 79 for journaling a cross shaft 80. The flap 76 is suspended from one end of the shaft 80 in the path of the dough dropping into the receptacle 44 (FIG. 1). The shaft 80 also carries a disk 81 having a notch 82 in the periphery thereof that is engaged with a roller 83 (FIG. 3). The roller 83 is carried by an arm 84 of a rock lever 85. The rock lever 85 is pivoted in a bracket 86 carried by the housing of the switch 75, so that the other arm 87 of the rock lever engages the actuator 88 of the switch 75 to momentarily close the switch 75 for operating the relay 46. The switch 75 is fixed to a rearwardly extending flange 89 of the bracket 77 by fastening devices such as screws 90 (FIG. 3). The bracket 77 is fixed to the extension 74 by fastening devices such as bolts 91 (FIG. 3).

The electrical connections for the relay 46, switches 47 and 75, and electromagnet 29, are shown diagrammatically in FIG. 7, which shows the relay 46 as comprising three sets of contacts 92, 93 and 94. The sets of contacts 92 and 93 of the relay connect current supply conductors 95 and 96 with conductors 97 and 98 that lead to the terminals of the electromagnet 29. The other set of contacts 94 connect through conductors 99 and 100 with the conductor 97 and one contact of the switch 47. The holding coil 101 of the relay is connected with the other terminal of the switch 47 by a conductor 102, and the other terminal of the holding coil is connected with the supply conductor 96 through a conductor 103, to complete a circuit through the switch 47 when the switch 47 is closed to energize the holding coil 101 for holding the relay contacts closed to supply current to the electromagnet 29 for holding the gate 4 closed to the passage of single dough pieces, and assure their movement on the conveyor 3 to the overhead proofer.

When a double dough piece B opens the switch 47, it breaks the circuit to the holding coil 101 to open circuit the electromagnet 29, so that the gate 4 snaps open under action of the spring 32. When the double dough piece passes the gate 4, it makes contact with the flap 76 and closes the switch 75. A current passes from the supply conductor 95 through a conductor 104 to one contact of the switch 75, through the other contact and conductor 102, to complete circuit through the holding coil 101 by way of the conductor 103 to the supply conductor 96.

The holding coil 101 is now energized to actuate the relay switch 46. The switch 75 will be immediately opened by dropping of the flap 76, but the other switch 47 is now closed to maintain a current flow through the holding coil 101 and the electric magnet 29 energized to swing the gate 4 to its original position, where it deflects the single dough pieces to the overhead proofer.

In installing the doubles eliminating apparatus, the units are secured to the dough rounder in the arrangement shown in FIG. 1. An insert 105 is cut to shape to fill any space that might exist between the gate and the rim 2 of the rounder, as shown in FIG. 2. This insert, after cutting the insert to shape, may be secured to the rounder by screws 106.

The flap 48 is adjusted to clear the single dough pieces A, and with the dough rounding machine in operation, the pieces of dough travel circumferentially about the inner face of the upwardly and outwardly flared wall of the rounder, to form the pieces of dough into round balls A that are discharged from the rim 2 of the rounder by deflection onto the conveyor 3 by the gate 4, as shown in FIG. 1, since the electromagnet 29 is energized and is holding the gate 4 closed against action of its spring 32. However, should two pieces of dough become stuck together, so that the rounder produces a double piece of dough, each double piece will be of large enough diameter to actuate the flap 48 and open the switch 47 to interrupt current flow through the holding coil 101. This allows the relay contacts 92, 93 and 94 to open, cutting the current supply to the electromagnet 29, whereupon the spring 32 is instantly effective to swing the gate 4 to open position, where the arm 24 engages the stop 45. The gate 4 is held open by the double piece B while the double piece B is passing the gate on its fall into the receptacle 44. After the double piece of dough has passed the flap 48, the flap 48 returns to its normal position and closes the switch 47. However, as the double piece of dough falls into the receptacle 44, it makes contact with the flap 76 to effect momentary closure of the switch 75, to again establish a flow of current through the switch 47 and holding coil 101, to close the relay contacts 92, 93 and 94 and reestablish a current flow through the electromagnet 29 to draw the gate 4 closed. The apparatus will remain in this condition as long as any doubles do not appear under the flap 48, and the single pieces of dough will be deflected by the gate 4 onto the conveyor 3 to be carried thereon to the overhead proofer.

From the foregoing, it is obvious that we have provided a simple and reliable apparatus for automatically and mechanically eliminating any doubles that may be formed in the dough rounding machine.

What we claim and desire to secure by Letters Patent is:

1. An apparatus adapted for attachment to a dough rounding machine to eliminate large pieces of dough, said apparatus including a base plate, means for attaching the base plate to the dough rounding machine, a shaft extending vertically through the base plate, bearing means carried by the base plate for oscillatably mounting the shaft, a gate on the shaft for guiding pieces of rounded dough, an arm connected with said shaft, an electromagnet carried by the base plate and having connection with said arm, a spring sleeved on said shaft and having one end connected with the shaft and the other end fixed relatively to said bearing means to normally move the gate out of the path of the dough pieces, a guide post for attachment to the dough rounding machine ahead of the base plate, a switch supporting means slidable on the guide post, a normally closed switch on said supporting means, an arm in fixed relation with said switch supporting means, a flap pivoted on the arm, means connecting the flap with said switch to open the switch when the flap is contacted by a large piece of dough, means for adjusting the switch supporting means on the guide post to adjust the flap to the size of the dough pieces to be eliminated, an arm oscillatable on the base plate, a normally open switch on the base plate, means connecting said arm with the normally open switch, a flap on said arm, an electric circuit interconnecting said switches with the electromagnet, means for supplying an electric current, and a relay switch connecting the current supply means with said circuit to energize the electromagnet and to open the current supply when the normally closed switch is opened by a dough piece to effect opening of the gate for eliminating said dough piece for contact with said last named flap to close the normally open switch to effect closing of the relay and reenergization of the electromagnet for moving the gate to its original position.

2. An apparatus adapted for attachment to a dough rounding machine to eliminate large pieces of dough, said apparatus including a base member, means for attaching the base member to the dough rounding machine, a shaft extending vertically through the base member, bearing means carried by the base member for oscillatably mounting the shaft, a gate on the shaft for guiding pieces of rounded dough in one direction, an arm connected with the shaft, an electromagnet carried by the base member and having connection with said arm, a coil spring sleeved on the shaft and having one end connected with the shaft and the other end fixed relative to said bearing means to urge the gate out of the path of the dough pieces, a normally closed switch, means for normally supporting said switch ahead of the gate, an arm oscillatably mounted on said switch supporting means, sensing means carried by said arm in the path of large pieces of dough, means connecting the shaft with the normally closed switch to open the switch when the sensing means is contacted by a large piece of dough, means for adjusting the sensing means to the size of the dough pieces to be eliminated, an arm oscillatable on the base member at the opposite side of said gate, a normally open switch, means connecting said arm with the normally open switch, a feeler on said arm, an electric circuit interconnecting said switches with the electromagnet, means for supplying an electric current to said circuit, and a relay switch connecting the current supply means with said circuit to energize the electromagnet and to open the current supply when the normally closed switch is opened by a dough piece to effect opening the gate for eliminating said dough piece for contact with said feeler to effect closure of the normally open switch and closing of the relay for reenergization of the electromagnet for returning the gate to its original position.

References Cited in the file of this patent
UNITED STATES PATENTS

| | | |
|---|---|---|
| 2,393,188 | Reynolds | Jan. 15, 1946 |
| 2,399,894 | Schulz | May 7, 1946 |
| 2,706,042 | Mandeville | Apr. 12, 1955 |